CONTROL SIGNAL DIAGRAM

INVENTORS
TAYLOR C. FLETCHER
WILLIAM E. SHOEMAKER
BY T E Kristofferson
ATTORNEY

SINGLE CHANNEL SWITCH-SCHEMATIC

*INVENTORS*
TAYLOR C. FLETCHER
WILLIAM E. SHOEMAKER
BY T E Kristofferson
ATTORNEY

8- DRIVER - BLOCK DIAGRAM

INVENTORS
TAYLOR C. FLETCHER
WILLIAM E. SHOEMAKER
BY T. E. Kristofferson
ATTORNEY

TYPICAL DRIVER AND ISOLATED PULSE TRANSFORMER

LIMITER CIRCUIT

INVENTORS
TAYLOR C. FLETCHER
WILLIAM E. SHOEMAKER

BY T. E. Kristofferson
ATTORNEY

CARRIER AND PULSE AMPLIFIER DRIVER.

INVENTORS
TAYLOR C. FLETCHER
WILLIAM E. SHOEMAKER
BY T. E. Kristofferson
ATTORNEY

H-BUS POWER SUPPLY - BLOCK DIAGRAM

INVENTORS
TAYLOR C. FLETCHER
WILLIAM E. SHOEMAKER
BY T E Kientzjenson
ATTORNEY

Jan. 14, 1969 T. C. FLETCHER ET AL 3,422,360

ELECTRONIC COMMUTATOR EMPLOYING A SINGLE AMPLIFIER FOR A MULTITUDE OF DATA CHANNELS

Filed Jan. 29, 1964 Sheet 7 of 9

L-BUS TO GUARD SWITCH BLOCK DIAGRAM

INVENTORS
TAYLOR C. FLETCHER
WILLIAM E. SHOEMAKER

BY T E Kris Ty Jeson

ATTORNEY

PULSE AMPLIFIER BLOCK DIAGRAM

*INVENTORS*
TAYLOR C. FLETCHER
WILLIAM E. SHOEMAKER

BY T E Kristofferson
ATTORNEY

INVENTORS
TAYLOR C. FLETCHER
WILLIAM E. SHOEMAKER
BY T E Kiis W Jenson
ATTORNEY

United States Patent Office 3,422,360

Patented Jan. 14, 1969

3,422,360

ELECTRONIC COMMUTATOR EMPLOYING A SINGLE AMPLIFIER FOR A MULTITUDE OF DATA CHANNELS

Taylor C. Fletcher and William E. Shoemaker, Fullerton, Calif., assignors to Beckman Instruments, Inc., a corporation of California Filed Jan. 29, 1964, Ser. No. 340,930

U.S. Cl. 328—104 8 Claims

Int. Cl. H03k 17/02

ABSTRACT OF THE DISCLOSURE

An electronic commutator employing a single amplifier for a multitude of data channels employing a switching sequence permitting common mode and transferred charge to settle out.

This invention relates to an improved electronic commutator and more particularly to an electronic commutator for use in a data sampling system.

Prior art data sampling systems have employed a separate amplifier in each data channel. Such a system results in a high cost, relatively large device. Prior attempts to simplify these systems and use only one amplifier have been susceptible to error due to common mode signals, or differences in the ground potentials. Another problem relates to changes in signal voltages caused by charges transferred during switching between channels. Still another problem is related to referencing the signal potential to ground while maintaining good accuracy and linearity. Accordingly, it is an object of this invention to provide an electronic commutator which employs a single amplifier for a multitude of data channels with resulting small size and low cost and that is versatile in that, within bounds, the number of channels may be varied at will.

Another object of the invention is to employ a particular switching sequence providing greater accuracy since spurious signals due to common mode and transferred charge are permitted to settle out.

Still another object of the invention is to employ a switching sequence to close the ground or low-line switch of the input signal first before the high-line switch in order to charge up the capacity in the circuit via the L-line before closing the H-line switch, to avoid disturbing the charge on the input filter capacitor, eliminating cross-talk due to common mode.

A further object of the invention is to provide a unique carrier system of controlling line switches.

A still further object of the invention is to provide a regulated power supply in order to obtain minimum drift associated with the transistor switches employed, and to avoid drooping off of base voltage of transistor switches with resulting changes in the current and off-set voltage.

In carrying out the invention in one form thereof a number of data channel switches are controlled by combined circuitry including high and low-bus power supplies for generating switching signals controlled in turn by a driver circuit having inputs from the systems timing circuitry and from a carrier and amplifier driver. The carrier and amplifier driver also provides switching signals and has inputs, driven from the amplifier, system timing and the OR'D enable signals from the various data channel inputs. The combined commutator circuitry functions to control four switches in the amplifier, an input switch in series with the input, an input clamp across the input, a reset switch across the post amplification stage or stages and a transformer discharge switch in series with a feedback transformer in the amplifier. The combined commutator circuitry functions to sequence the opening and closing of these switches to clear and reset the amplifier before it receives each input signal as well as to switch the L-line of each data input channel into the amplifier prior to switching in the H-line to permit charging-up of capacities in order to start from a common point.

A guard clamp switch may also be used to connect the L-bus of the sampled channel to the guard in the input to the amplifier. Additional isolation is provided by isolation transformers.

The novel features characteristic of the invention are set forth with particularity in the appended claims. The invention itself, however, together with further objects and advantages thereof can best be understood by reference to the following description taken in connection with the accompanying drawings in which:

It is understood, of course, that the detailed circuitry shown is intended to be illustrative of an embodiment of the invention which has been constructed in order to facilitate the practice of the invention and to conserve the effort necessary by those skilled in the art in so doing. The embodiment is in no way intended to limit the invention but is merely given by way of example, the true scope of the invention being defined by the appended claims.

Figure 1:
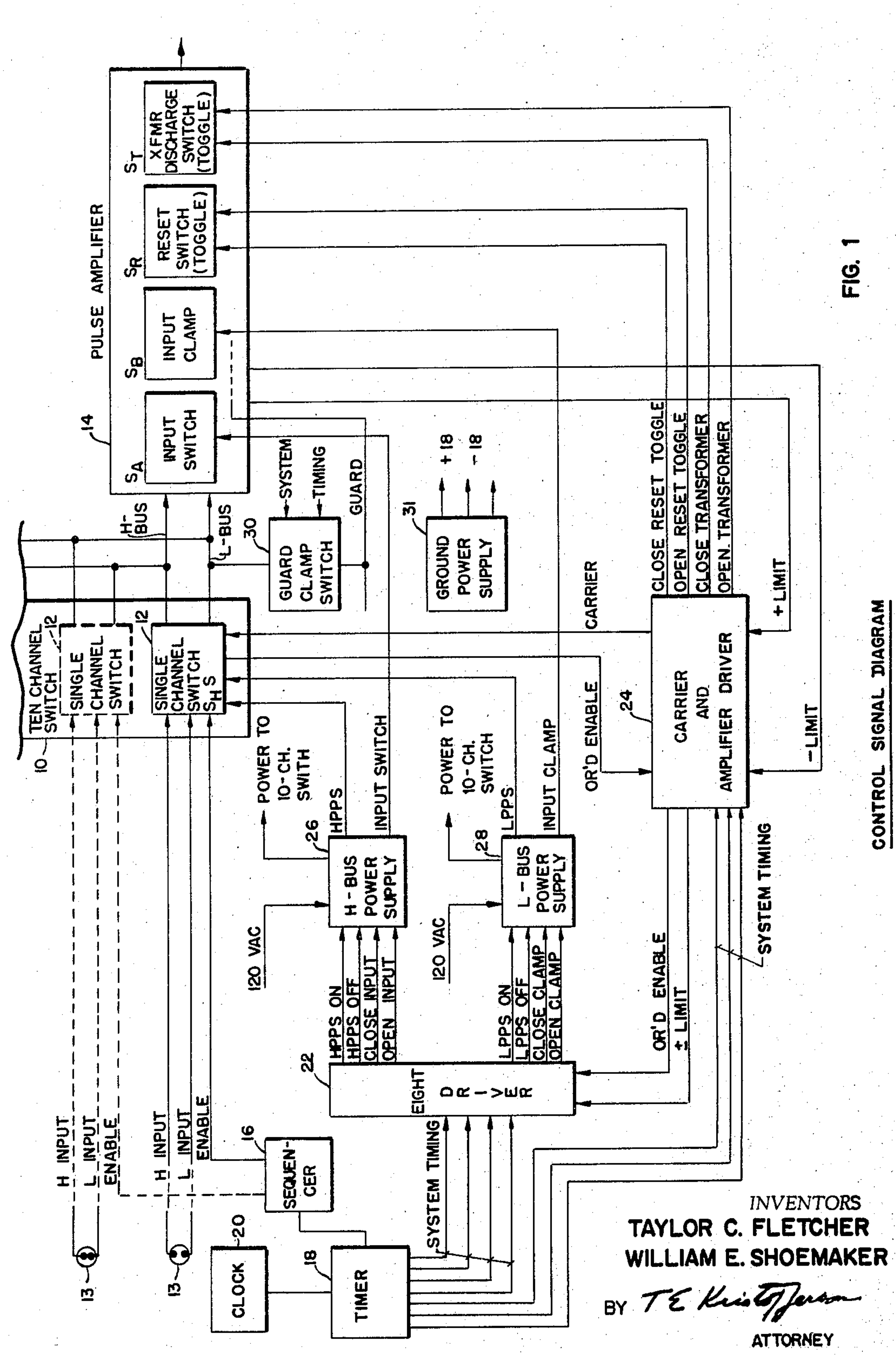
FIG. 1 is a control system block diagram of the entire commutator and amplifier.

Turning now to the drawings, in FIG. 1 a control signal system block diagram is illustrated for one embodiment of the electronic commutator or multiplexer of the invention with associated pulse amplifier, timing and sequencing circuitry. A ten-channel switch 10 is illustrated having a number of single channel switches 12 therein, one for each data channel. Any number of ten-channel switches may be connected in parallel, limited only by the power supplies and increased isolation problems. These switches 12 have outputs which are connected together in parallel and to the inputs of the pulse amplifier 14 for transmitting data pulses through the channel switches 12 and to the amplifier 14. As illustrated, each of the single channel switches 12 has an H-input, or high-line input, from a data source 13 and an L-input, or low-line input.

Each single channel switch 12 is also provided with an enable input from sequencer 16. Sequencer 16 is in turn provided with an input pulse each complete amplifier cycle from a timer 18, which is in turn fed timing pulses from a clock 20. Clock 20 may produce, for example, 250 kilocycle signals or one pulse every four microseconds. Timer 18 is a six-by-six matrix which in turn will produce pulses every four microseconds until the cycle of 36 pulses is complete. Sequencer 16 receives an input pulse from timer 18 once for every complete cycle of the timer, i.e., every 144 microseconds, and generates an enable signal for each timer cycle.

Timing signals from timer 18 are also provided to an eight-driver circuit 22 and a carrier and amplifier driver 24. Eight-driver 22 also receives an OR'D enable signal from carrier and amplifier driver 24 which is originated in the ten-channel switch 10 by ORING all the enable signals which are inputs to single channel switches 12. A plus or minus limit signal is also generated in carrier and amplifier driver 24 and serves as another input to eight-driver 22.

Eight-driver 22 in turn generates a series of signals which are transmitted to an H-bus, or high-bus, power supply 26 and to an L-bus, or low-bus, power supply 28. The signals to H-bus power supply 26 are for turning the H-programed power supply toggle and switch on and off and for opening and closing an input switch $S_A$ in amplifier 14. The signals to L-bus power supply 28 are for turning the L-programed power supply toggle and switch on and off and for opening and closing an input clamp $S_B$ in amplifier 14. The H-bus power supply 26 and L-bus power supply 28 also receive a 120 volt A.C. input and provide plus, minus and common D.C. output power to the ten-channel switches 10. H-bus power supply 26 has two outputs one of which controls the input switch $S_A$ in pulse amplifier 14 and the second of which is fed as the H-programed power supply signal to single channel switches 12. L-bus power supply 28 has similarly two output signals, one of which controls the input clamp $S_B$ in pulse amplifier 14 and the second of which goes to the L-programed power supply inputs to single channel switches 12.

Carrier and amplifier driver 24 also provides a number of other signals including a carrier output which serves as an input to single channel switches 12 and close and open reset signals to the reset switch, $S_R$, toggle of pulse amplifier 14 as well as close and open transformer discharge switch, $S_T$, signals to that toggle of pulse amplifier 14. Signals indicative of pulse or minus voltage limits are also generated in pulse amplifier 14 and serve as inputs to carrier and amplifier driver 24, which combines them to provide the plus or minus limit signal which serves as an input to eight-driver 22.

A guard clamp switch 30 is connected between the L-bus of single channel switches 12 and the guard in the input to pulse amplifier 14, and receives inputs from the system timing circuitry. A ground power supply 31 is also provided to generate, for example, ±18 volts D.C. referenced to a common terminal, used in the eight-driver 22 and in the carrier and amplifier driver 24.

In order to better describe the operation of the commutator or multiplexer of the subject invention, each of the individual circuits employed in the control signal block diagram of FIG. 1 will now be described in more detail.

Figure 2:
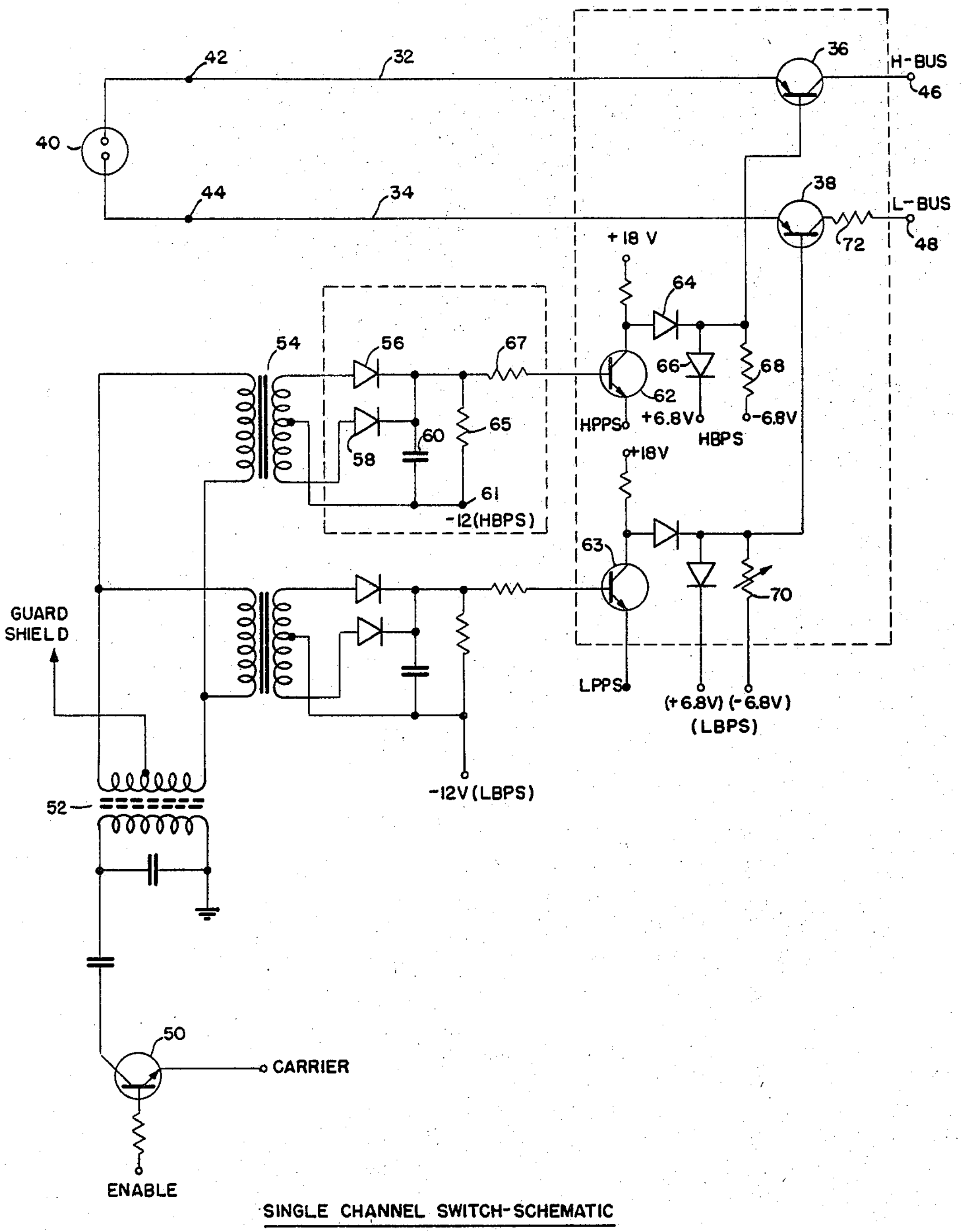
FIG. 2 is a schematic circuit diagram of a single channel swihch such as employed in the block diagram of FIG. 1.

A switch which may be used for the single channel switches 12 of FIG. 1 is illustrated in FIG. 2. Two input lines, H-line 32 and L-line 34, contain as switching devices, transistors 36 and 38, respectively. A data sensor 40 is connected across input terminals 42 and 44 of lines 32 and 34, respectively. When switches 36 and 38 are on, H-line and L-line signals from sensor 40 appear at terminals 46 and 48, respectively. In the switching circuitry a transistor 50 is provided with a carrier signal, which may be a 1 megacycle signal, for example, from the carrier and amplifier driver 24 of FIG. 1, supplied to its emitter, and an enable pulse from sequencer 16 of FIG. 1 for the channel involved applied to its base. ANDING the two signals, when the enable signal becomes true, transistor 50 is forward biased and the carrier is applied to the primary winding of carrier transformer 52.

Operation of the H-line circuitry is similar to operation of the L-line circuitry. In the H-line, the output from the secondary of carrier transformer 52 is applied across the primary of carrier transformer 54, the secondary of which is applied to a full wave diode rectifier consisting of diodes 56 and 58. Filtering is supplied by capacitor 60. With the enable signal on the base of transistor 50 false, no rectified carrier is present at the output of diodes 56 and 58. Thus the base of transistor 62 is such that the transistor is back-biased, for example, −12 volts by a potential applied to terminal 61 from the H-bus power supply 26 of FIG. 1, through resistors 65 and 67. Both diodes 64 and 66, connected as shown in the collector of transistor 62, are forward biased and a resulting voltage appears at the base of transistor 36 holding it off, for example, +7.5 volts.

With the enable signal at the base of transistor 50 true, a rectified carrier is present at the base of transistor 62 which is then less negative, but transistors 62 and 36 remain back-biased. A line from the H-programed power supply, a part of H-bus power supply 26 of FIG. 1, is connected to the emitter of transistor 62. When this line becomes true, for instance, −12 volts, transistor 62 turns on, the emitter is less positive, diode 64 is back-biased and a base current, limited by a resistor 68 connected between the base of transistor 36 and a source of negative potential, for example −6.8 volts derived from H-bus power supply 26 of FIG. 1, turns transistor 36 on.

As previously mentioned, operation of the L-line switching circuitry is similar to that of the H-line. However, the base resistor 68 of transistor 36 is fixed while transistor 38 has a variable base resistor 70 connected between its base and a source of negative potential, for example −6.8 volts derived from L-bus power supply 28 of FIG. 1, which serves as an off-set adjustment. This adjustment is used to equalize the drop across the two switches. A small resistor 72 may be added to the collector circuit of transistor 38 to permit effective off-set voltage adjustment.

Figure 3:
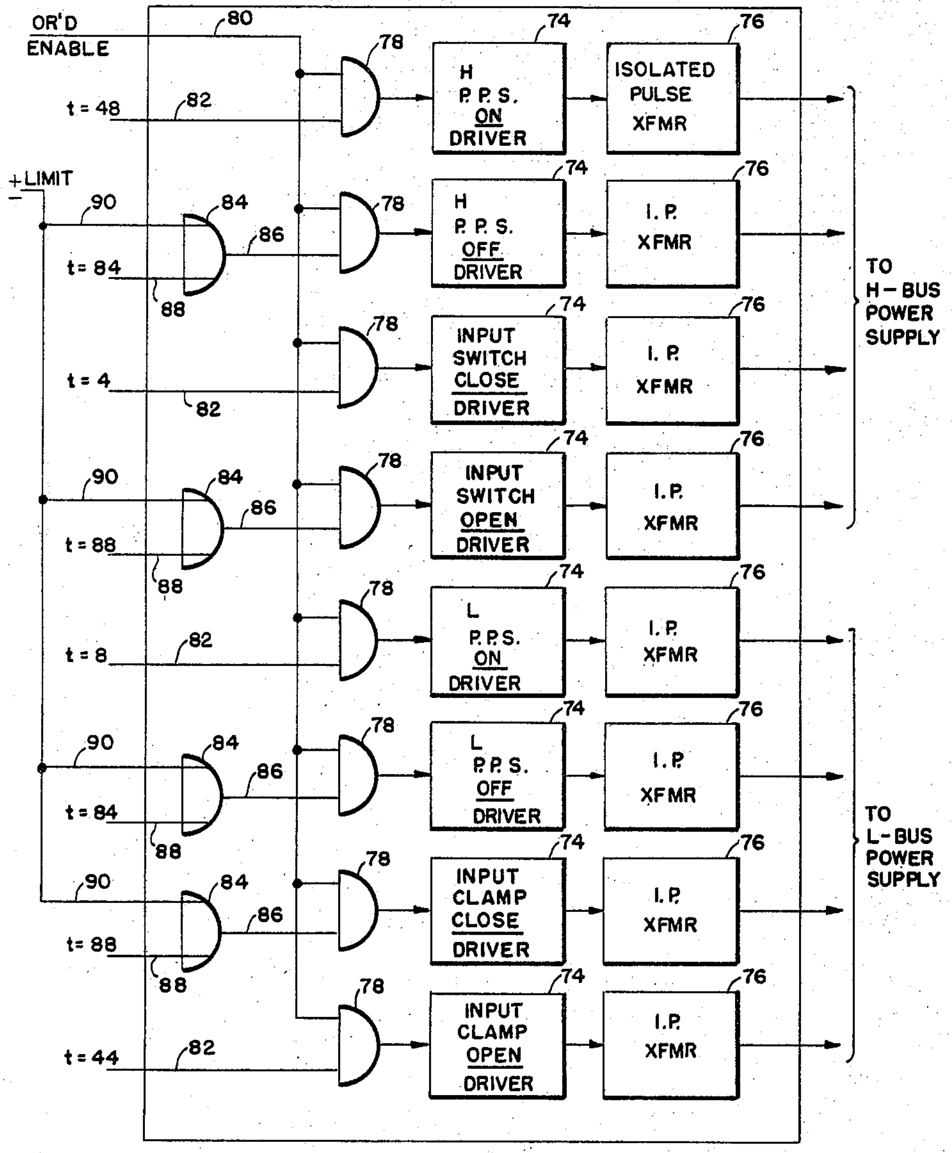
FIG. 3 is a diagram partly in schematic and partly in block form of the eight-driver circuit employed in FIG. 1.

In FIG. 3, the eight-driver 22 of FIG. 1 is illustrated, partly in logic and partly in block diagram form. This unit is called an eight-driver because it consists of eight drivers 74 in the form of regenerative amplifiers, each with an associated isolated pulse transformer 76 in its output and with digital logic in its input. Each driver 74 supplies one of the inputs to the H-bus or L-bus power supplies 26 and 28 of FIG. 1. System clock pulses from timer 18 of FIG. 1 control the generation of the signals which open and close the input switch $S_A$ and input clamp $S_B$ in amplifier 14 of FIG. 1, and turn the H- and L-programed power supplies, in H-bus power supply 26 and L-bus power supply 28, on and off. The order of these functions will be discussed later in connection with the discussion of the system timing diagram of FIG. 11. Clock inputs to the drivers 74 are ANDED in AND devices 78 with the OR'D enable line 80 from carrier and amplifier driver 24 of FIG. 1. The OR'D enable is applied to AND circuits 78 on line 80 and the timing signals are either applied directly to the AND circuits 78 as on lines 82 or through OR circuits 84 as on lines 86. The inputs to OR circuits 84 are timing signals as on lines 88 and the plus or minus amplifier limit signal from carrier and amplifier driver 24 of FIG. 1 applied to lines 90. The latter signal is applied so that if the amplifier plus or minus voltage limit signal becomes true, indicating saturation of the amplifier 14 of FIG. 1 in one direction or the other, signals are passed through OR devices 84, and AND devices 78, because an enable signal does exist on line 80, to turn off both programed power supplies, open the amplifier input switch $S_A$ and close the amplifier input clamp $S_B$. The transformer discharge switch $S_T$ is opened and the reset switch $S_R$ closed by the driver 24 at the same time as described in connection with FIG. 5. Guard clamp switch 30 is also opened. This is done to prevent lock-up of the amplifier 14 of FIG. 1 in the event of saturation.

Figures 4, 9:
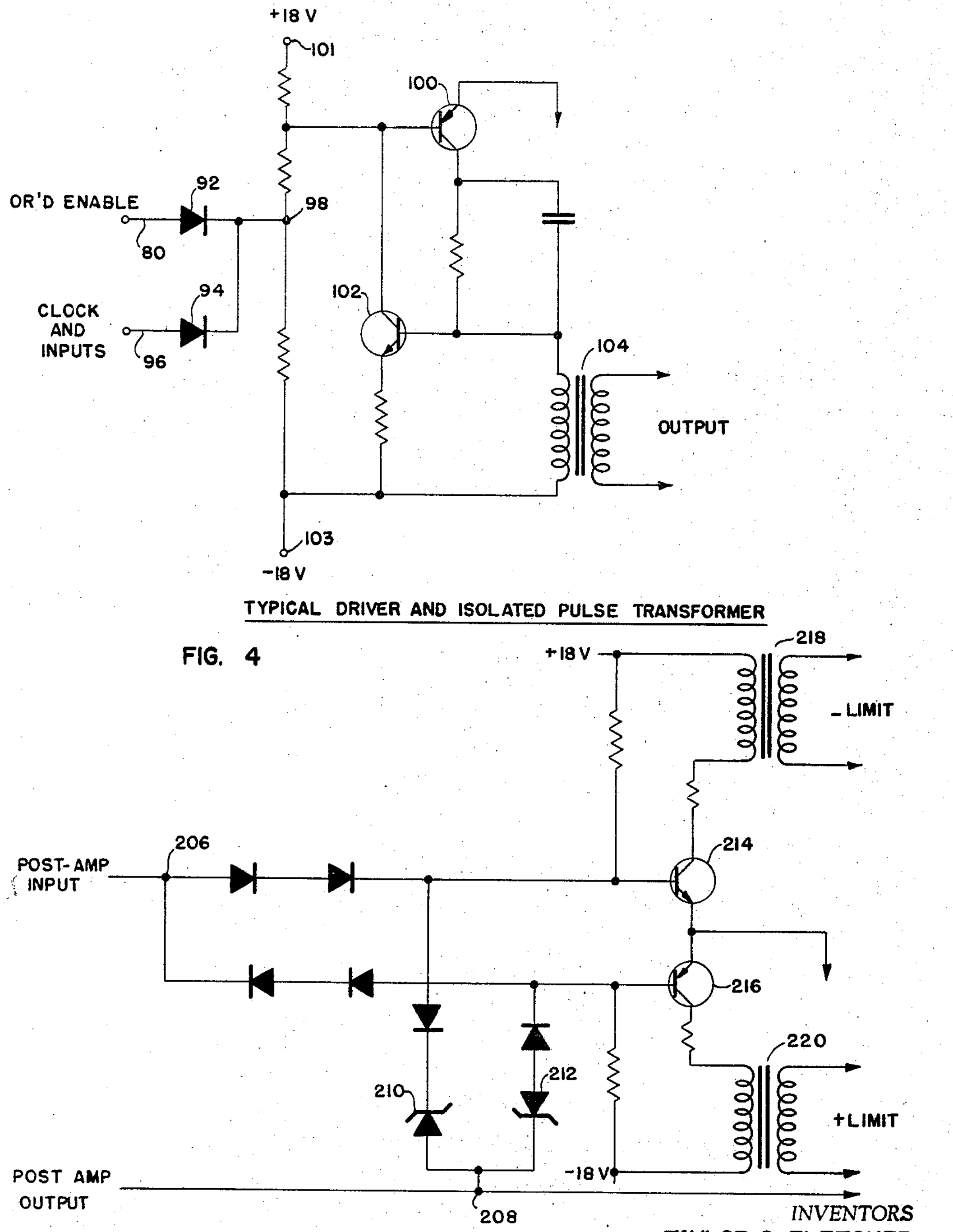
FIG. 4 is a schematic diagram of a typical driver and isolated pulse transformer such as may be used in the block diagrams of FIGS. 3 and 5.
FIG. 9 is a schematic diagram illustrating a voltage limiter and plus and minus limit pulse generators which may be used in the circuit of FIG. 8.

FIG. 4 illustrates a typical driver and pulse transformer which may be used for drivers 74 and transformers 76 in FIG. 3. Two inputs are provided to an AND circuit consisting of diodes 92 and 94, one from the OR'D enable on line 80 and the other from timer 18 or the plus or minus limit signal from driver 24 of FIG. 1, on line 96 which represents either line 86 or 82 of FIG. 3. When ANDED, they are passed to terminal 98 driving the base of transistor 100 negative, turning it on. As transistor 100 conducts, the base of transistor 102 will move in a positive direction, turning it on. The emitter-collector circuit of transistor 100 and the collector-base path of transistor 102 are both connected in series with a primary winding of isolated pulse transformer 104, transistor 102 thus providing additional current through the primary resulting in a sharp spike at the secondary or output of pulse transformer 104. Plus and minus voltages, for example, ±18 volts are applied to terminals 101 and 103 and are derived from the ground power supply 31 of FIG. 1.

Figure 5:
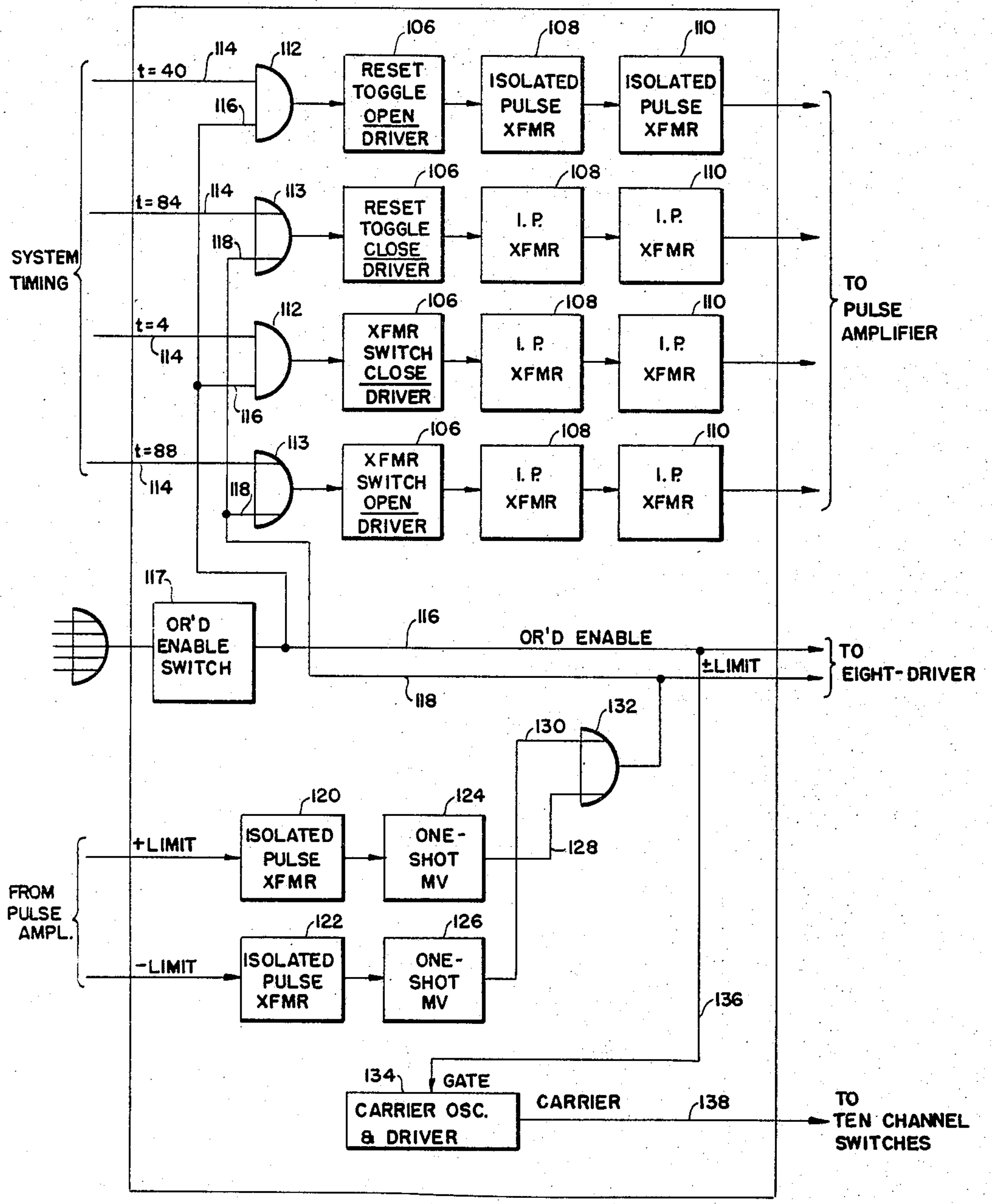
FIG. 5 is a partly logic, partly block diagram illustration of the carrier and amplifier driver circuit such as may be employed in the circuit illustrated in FIG. 1.

The carrier and amplifier driver 24 of FIG. 1 is illustrated in more detail in combined logic and block diagram form in FIG. 5. The cycling of the amplifier 14 of FIG. 1 is controlled in part by the reset toggle $S_R$ and the transformer discharge toggle $S_T$ within the amplifier 14. These toggles are turned on and off by pulses generated at the carrier and amplifier driver 24. The drivers 106 illustrated by blocks may be similar to those of the eight-driver board illustrated in FIG. 4. These drivers 106 in the carrier and amplifier driver, however, each have two isolated pulse transformers 108 and 110 connected in series in their outputs. The outputs of the second pulse transformers 110 are referenced to guard shield ground for complete isolation.

Inputs to the drivers 106 are received through AND circuits 112 or OR circuits 113 from systems timing pulses on lines 114 and either the OR'D enable signal from the ten-channel switch 10 of FIG. 1 on lines 116 passed through an OR'D enable switch 117, as in the case of the reset toggle $S_R$ open driver 106 and the transformer switch $S_T$ close driver 106, or from the plus or minus limit signal generated in the carrier and amplifier driver on lines 118. The occurrence of the plus or minus limit signal on line 118 serves to open transformer discharge switch $S_T$ and close reset switch $S_R$ to prevent lock-up as described in connection with FIG. 3 previously.

The plus or minus limit signal on line 118 is generated by receiving a plus limit or minus limit signal at isolated pulse transformers 120 and 122, respectively, from the amplifier 14 of FIG. 1, which are in turn fed through one-shot multivibrators 124 and 126, respectively, to indicate the presence of a plus limit on output line 128 or a minus limit on output line 130. OR circuit 132 receives inputs from lines 128 and 130 to give an output on line 118 indicative of the presence of either a plus or minus limit. The OR'D enable line 116 and the plus or minus limit line 118 are also sent on to the eight-driver 22 of FIG. 1. The carrier oscillator and driver 134 supplies a carrier signal, for example at 1 megacycle, for the operation of the ten-channel switches 10 of FIG. 1. A signal on line 136 coming from the OR'D enable line 116 serves to gate the carrier oscillator and driver 134 on such that the carrier signal exists on the output line 138 to the ten-channel switches only when the OR'D enable line 116 is true.

Figure 6:
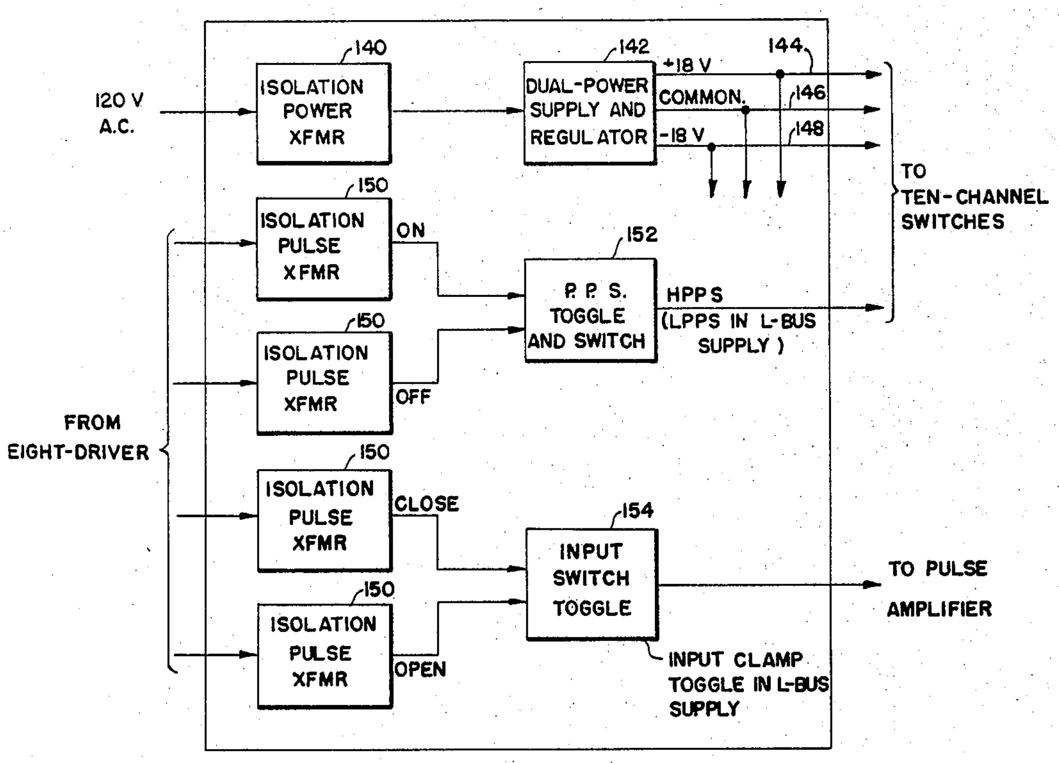
FIG. 6 is a block diagram of a power supply such as may be used for the H-bus and L-bus power supplies illustrated in FIG. 1.

The H-bus and L-bus power supplies 26 and 28 of FIG. 1 are similar and are illustrated in more detail in FIG. 6 in block diagram form. 120 volts A.C. is applied through an isolation power transformer 140 to a dual power supply and regulator 142. Dual power supply and regulator 142 may consist of two low dissipation solid state power supplies such as are disclosed in U.S. Patent application Ser. No. 226,549, entitled "Low Dissipation Power Supply," Shoemaker, filed Sept. 27, 1962, now Patent No. 3,260,920 and assigned to the assignee of the present invention. The high and low sides of the outputs of two such supplies may be tied together using a common primary and separate secondaries on the input transformer, to provide the plus, common and minus voltages present on the output lines 144, 146 and 148, respectively, of dual power supply and regulator 142 which are in turn provided to the ten-channel switch 10 of FIG. 1 as shown in FIG. 1 by the lines HPPS and LPPS and the lines marked Power to 10-CH switch from H-bus and L-bus power supplies 26 and 28. In the H-bus power supply common line 146 is tied to H-bus 46 of FIG. 2. This provides the return path for the base-collector current which serves to switch transistor 36. The L-bus power supply common line is similarly connected to L-bus 48.

Four isolation pulse transformers 150 are provided with inputs from the eight-driver 22 of FIG. 1, in the case of the H-bus power supply, to turn the H-programed power supply on and off and to open and close the input switch toggle. The H-programed power supply on and off signals are fed to the programed power supply toggle and switch 152 and the input switch toggle close and open signals are fed to input switch toggle 154. The output of toggle and switch 152 provides the H-programed power supply signal to the emitter of transistor 62 as illustrated in FIG. 2. The input switch toggle 154 controls the input switch $S_A$ in pulse amplifier 14 in FIG. 1.

As indicated on the drawing of FIG. 6 the input switch toggle 154, in the case of the L-bus power supply, serves the function of actuating the input clamp $S_B$ of the pulse amplifier 14 of FIG. 1 and the HPPS output line from switch 152 is replaced with the L-programed power supply signal which is fed to the emitter of transistor 63 in FIG. 2, which is the counterpart of transistor 62 in the H-line circuitry as far as operation of the L-line circuitry goes.

Figure 7:
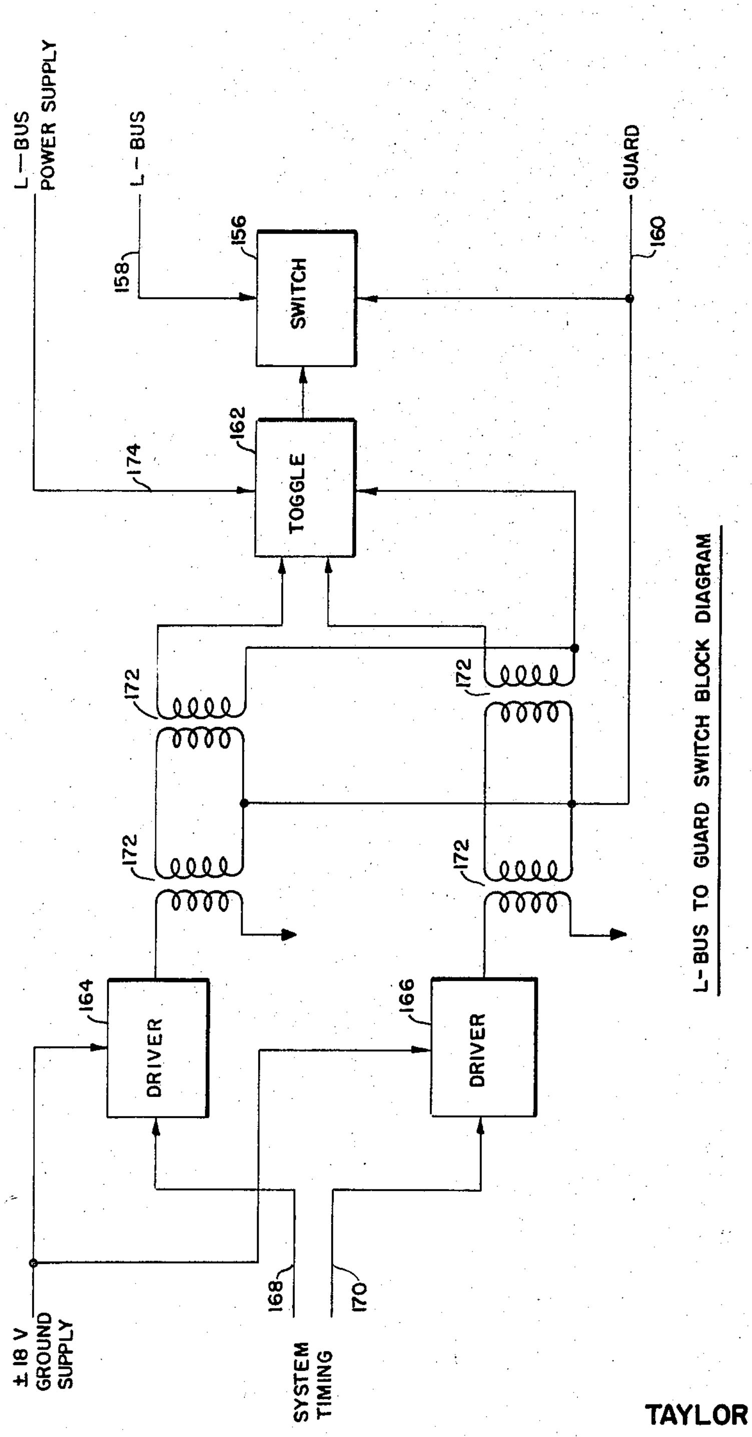
FIG. 7 is a partly schematic, partly block diagram of a guard clamp switch such as is illustrated in FIG. 1.

In some applications it is considered to be desirable to provide the guard clamp switch 30 illustrated in FIG. 1 and in more detail in FIG. 7. The switch 156 is wired between the L-bus by line 158 and the guard in the input of the pulse amplifier 14 of FIG. 1 by line 160. The switch 156 uses a floating toggle 162 which is set and reset by two drivers 164 and 166, triggered by system timing on lines 168 and 170, respectively, to close and reopen switch 156 once during each pulse amplifier cycle. Pulse transformers 172 are used between the drivers 164 and 166 and the toggle 162 to provide complete isolation. The toggle 162 is referenced to the L-bus and receives its power from the L-bus power supply on line 174. The drivers 164 and 166 receive power, for example, ±18 volts, from a plus and minus power supply illustrated as ground power supply 31 in FIG. 1.

Figure 8:
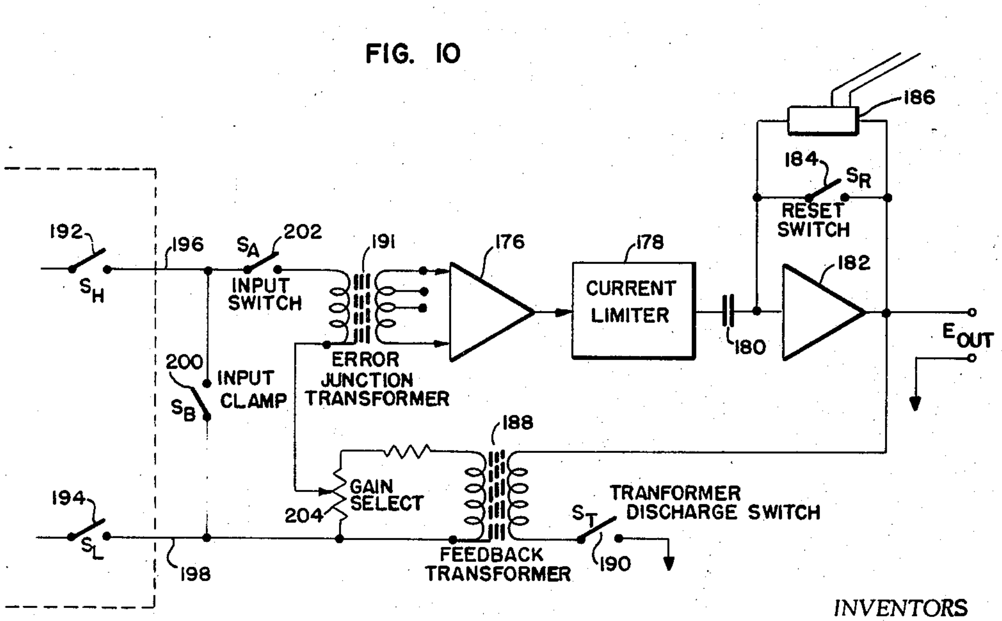
FIG. 8 is a partly schematic, partly block form diagram of a pulse amplifier and associated switching circuitry such as may be used in the circuit of FIG. 1.

FIG. 8 illustrates, partly in schematic and partly in block form, an amplifier and the associated switches which may be used as pulse amplifier 14 of FIG. 1, in greater detail. The amplifier of FIG. 8 consists of a preamplifier portion 176 followed by series connected current limiter 178 and reset coupling capacitor 180, connected in turn to the input of a post amplifier 182. Post amplifier 182 has a reset switch 184 and a combined voltage limiter and plus and minus limit pulse generator 186 each connected in parallel with it from output to input. The output of post amplifier 182 is fed back through feedback transformer 188 which has a transformer discharge switch 190, $S_T$, connected in series with its primary. A portion of the secondary voltage of feedback transformer 188 taken from potentiometer 204 is added directly to the input voltage on the primary of an error junction transformer 191, the secondary of which provides the input voltage for preamplifier 176. An H-line switch 192 and an L-line switch 194, equivalent to $S_H$ and $S_L$ or the transistors 36 and 38 of FIG. 2, respectively, are connected in the high and low-lines 196 and 198, respectively, across which an input clamp 200, $S_B$, is connected. Line 196 is connected through amplifier input switch 202, $S_A$, to the high side of the primary of transformer 191. The low side of the primary of transformer 191 is then connected through the moveable contact of potentiometer 204 to its low side, which in turn is connected to the low-line 198. The end terminals of potentiometer 204 are connected across the secondary of feedback transformer 188.

The operation of the amplifier illustrated in FIG. 8 is described in more detail in United States patent application Ser. No. 290,779, Berneike et al., filed June 26, 1963 now Patent No. 3,249,883 and entitled "A.C. Coupled Pulse Amplifier with Floating Input and Grounded Output." The amplifier reset is also described in a United States patent application Ser. No. 290,780, Durrett, filed June 26, 1963, now U.S. Patent No. 3,263,177 entitled "A.C. Coupled Amplifier Offset Storage and Reset Circuit." The current limiter 178 is described in United States patent application Ser. No. 290,789 entitled "Amplifier Parallel Connected Cathode Follower Output Stage," Durrett, filed June 26, 1963 now U.S. Patent No. 3,312,833. The voltage limiter is described in United States patent application Ser. No. 290,778, Weekes, filed June 26, 1963, now U.S. Patent No. 3,248,569 and entitled "Amplifier Passive Nonlinear Feedback Voltage Limiting Network." All four of these applications are assigned to the assignee of the present invention. The current limiting feature is also discussed in connection with FIG. 3 of the aforementioned application Ser. No. 290,779 as is the voltage limiter portion of voltage limiter and plus and minus limit pulse generator 186 in FIG. 5. However, to illustrate the generation of the plus and minus limit pulses, reference is now made to FIG. 9 herein.

The circuit of FIG. 9 is connected across the input and output of post amplifier 182 of FIG. 8 at terminals 206 and 208, respectively. If the input signal amplitude is greater than full scale, the output of the post amplifier 182 of FIG. 8 rises until either Zener diode 210 or 212, depending upon the input signal polarity, breaks down and provides feedback to the amplifier input at terminal 206. At the same time, either transistor 214 or 216, again depending upon the polarity, is turned off generating an output spike at the secondary of one of the limit output transformers 218 or 220 which are connected in the collector circuits of transistors 214 and 216, respectively. The output spikes appearing on the secondaries of transformers 218 and 220 are fed to the carrier and amplifier driver 24 of FIG. 1, or D therein, and send to the eight-driver 22 of FIG. 1 to disconnect the input signal when a limit signal is received in the manner previously described. Again, operation of the voltage limiter portion of FIG. 9 is described in more detail in FIG. 5 of the above referenced patent application, Ser. No. 290,779.

Figure 10:
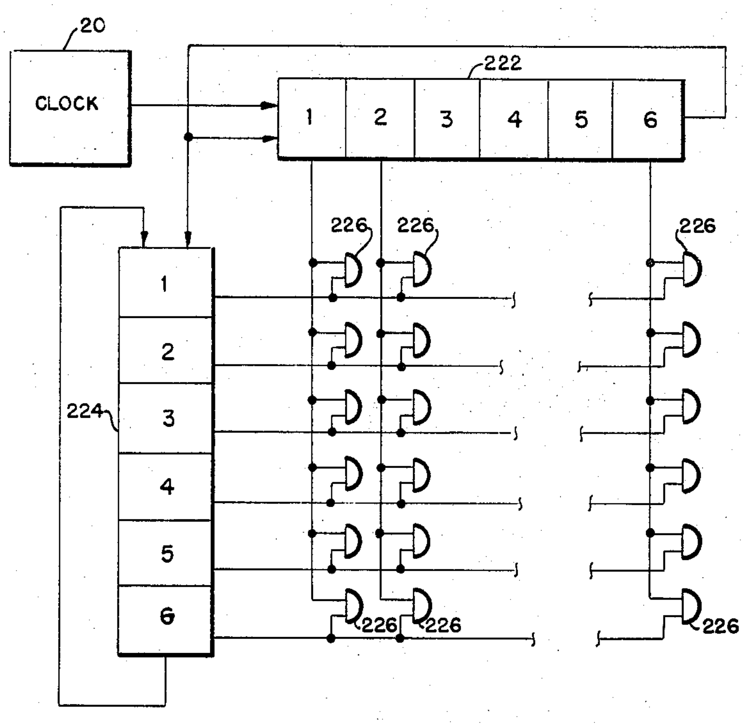
FIG. 10 is a partly schematic, partly block form diagram illustrating circuitry for generating the timing signals to provide the system timing pulses for the circuitry of FIG. 1.

The generation of the signal timing pulses for the system will now be described. As indicated in connection with FIG. 1, the clock 20 generates timing signals which may be spikes of short duration at a frequency of, for example, 250 kilocycles. Circuitry which may be used in the timer 18 and sequences 16 of FIG. 1 is illustrated in FIG. 10. Pulses from the clock 20 are fed into the input of a chain counter 222 which is illustrated as having six stages in series and is of the type where an input pulse advances the count one stage per count. The output of chain counter 222 is fed back to its input and also to the input of a second six stage chain counter 224 which also has an output fed back to its input. A matrix of AND circuits 226, thirty-six in number, in six rows of six each, is connected with inputs taken from the two chain counters 222 and 224 as follows. The first horizontal row of AND circuits 226 each have an input from the first stage of counter 224 and the second horizontal row from the second stage of counter 224, etc. The second input to each of the AND circuits 226 is provided by connecting inputs to the first vertical row of circuits 226 from the first stage of counter 222, the second vertical row to the second stage, etc.

With both first stages of counters 222 and 224 on, the AND circuit in the first horizontal and first vertical row will provide an output. The next input pulse from clock 20 will cause the second stage of counter 222 to turn on and this will actuate the AND circuit 226 in the second vertical and first horizontal row. This operation will continue, proceeding from left to right across the first horizontal row, then the second row and so on until, after thirty-five pulses have been received from clock 20, the final AND circuit 226 in the sixth horizontal and sixth vertical row is actuated. The next or thirty-sixth pulse from clock 20 will reset the counters 222 and 224 each back to their first stage and the leading edge of the output from the first AND circuit 226, indicating zero time, will trigger sequencer 16. With each pulse being spaced 4 microseconds apart at its leading edge, each AND circuit is on 4 microseconds such that the total time for the cycle for the thirty-six AND circuits 226 is 144 microseconds, which as described hereinafter is the complete cycle time for sampling a single data channel.

Sequencer 16 of FIG. 1 may be constructed in a similar manner in which case enable signals for selectively switching the individual data channel signs to pulse amplifier 14 of FIG. 1 may be taken from the AND circuits 226 in any desired order. The order of connecting the AND circuits 226 of sequencer 16 to the enables of the single channel switches 12 of FIG. 1 will determine the order in which the respective data channels are sampled. The length of the counters such as 222 and 224 and the number of AND circuits such as 226 will be determined by the number of data channels to be sampled.

It will be understood, of course, that certain of the AND circuits 226 of FIG. 10 may be eliminated, at least in timer 18, if the particular output at that time in the cycle is not essential to perform a particular switching function in the commutator. Also, the associated AND circuit may be left out of sequencer 16 during any time in which it is not desired to sample a data channel. It should be understood, however, that this will limit flexibility in programing.

Figure 11:
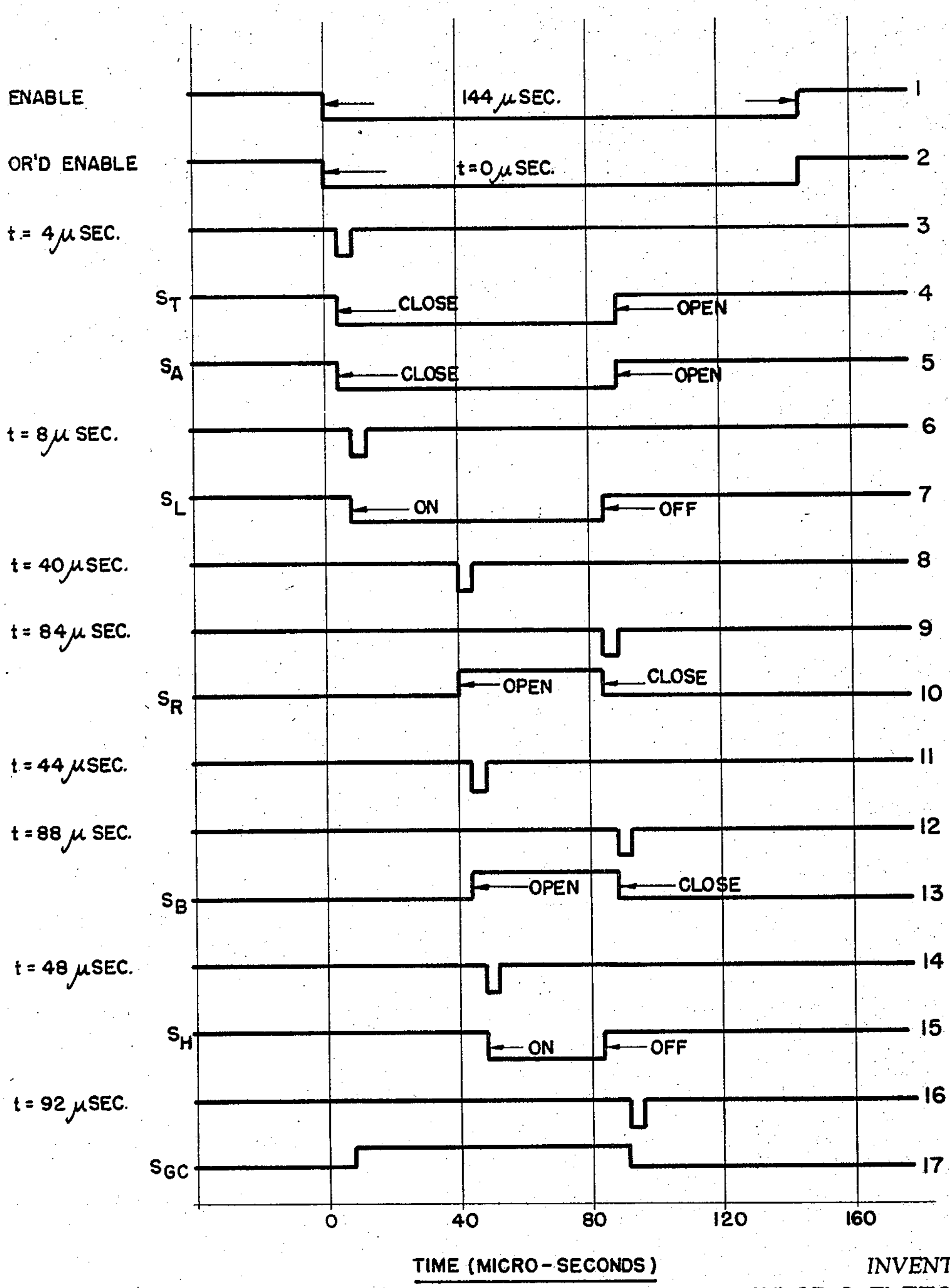
FIG. 11 is a diagram of system timing and switching signals used to illustrate operation of the system.

FIG. 11 illustrates a timing diagram which is useful in connection with explaining the sequence of operation of the commutator. At time zero on the abscissa of FIG. 11, the initial AND circuit in the time 18 of FIG. 1 has just been triggered and has put out an output pulse, triggering sequencer 16 to generate the top signal on the diagram of FIG. 11 or an enable signal for a particular data channel, which as is illustrated remains on for 144 microseconds or for the complete subsequent single channel data sampling cycle of the timer 18. This simultaneously triggers an OR'D enable signal, the second signal on the diagram, in the ten-channel switch 10 which passes to the carrier and amplifier driver 24 to trigger switch 117 and thence passes to the eight-driver 22.

Four microseconds later the next pulse from clock 20 actuates the second stage in counter 222 and the second AND circuit 226 in the first horizontal row in timer 18. The output from this AND circuit is shown as $t=4$ microseconds in the third line from the top in the diagram of FIG. 11. This pulse is connected to the input switch close driver 74 of the eight-driver circuit in FIG. 3, through associated line 82 and AND circuit 78. Since the OR'D enable signal is also present on line 80, this ANDS the circuit 78 and causes the generation of an input switch close signal which is passed through the isolated pulse transformer 76 in the output of input switch close driver 74 to the isolation pulse transformer 150 second from the bottom in the H-bus power supply shown in FIG. 6. This in turn serves to send a close signal to input switch toggle 154, which then passes the signal to the input switch $S_A$ of pulse amplifier 14 to close the switch in order to prepare the amplifier 14 to receive the next input signal.

The $t=4$ microseconds signal of the third line of FIG.

11 also triggers the transformer switch close driver 106 of FIG. 5 through the associated input line 114 and AND circuit 112 since the OR'D enable signal on line 116 is true, and serves to generate a signal through associated isolated pulse transformers 108 and 110 which is passed from the carrier and amplifier driver 24 to the pulse amplifier 14 to close the transformer discharge switch $S_T$. The closing of $S_T$ and $S_A$ are illustrated in the fourth and fifth lines of the diagram of FIG. 11, at the time 4 microseconds. Closing of the transformer discharge switch also prepares the amplifier 14 for reception of the next input signal from the data channels.

Four microseconds later the next pulse from clock 20 actuates the third AND circuit in the first horizontal row in timer 18 to generate the output pulse at 8 microseconds illustrated in the sixth line of the timing diagram of FIG. 11. This pulse is fed to the L-programmed power supply on driver 74 of FIG. 3, by way of associated line 82 and AND circuit 78 since the OR'D enable line 80 is also actuated. From there the signal passes through the associated isolated pulse transformer 76 to the L-bus power supply 28 of FIG. 1. Turning to FIG. 6, this is received at the top isolation pulse transformer 150 to generate an on signal to actuate the toggle and switch 152 and generate in turn an L-programed power supply signal. This is then passed from the L-bus power supply 28 to the single channel switches 12 where it is applied to the emitter of the transistor switches such as transistor 63 in FIG. 2. Since the enable signal has also been applied to the base of the transistor 50 in the channel to be sampled, the carrier signal is present in rectified form at the base of transistor 63 as previously described. The simultaneous occurrence of these two serve to drive the base of transistor 38 turning it on and thus switching the L-line to connect the input terminal 44 over line 34 through transistor 38 to the L-bus input of pulse amplifier 14. This is illustrated in the seventh line from the top in FIG. 11, showing the switch $S_L$ as being actuated at 8 microseconds.

The eight microsecond pulse from timer 18 is also applied to the guard clamp switch of FIG. 7 on line 168, for example, in which case driver 164 generates a signal to trigger the toggle 162, turning switch 156 on and connecting the L-bus to guard. This is illustrated in the bottom line of FIG. 11.

The next significant timing pulse from timer 18 is received at time $t=40$ microseconds as illustrated in the eighth line of the diagram of FIG. 11. As previously mentioned, if flexibility from the timer can be sacrificed, the intervening AND circuits between times $t=8$ microseconds and $t=40$ microseconds may be eliminated. The function of the forty microsecond pulse is to open reset switch $S_R$ in pulse amplifier 14. This is done by applying the forty microsecond pulse on the top line 114 of FIG. 5 in the carrier and pulse amplifier driver 24 of FIG. 1. Since the OR'D enable signal is also on line 116, AND circuit 112 passes a signal to the reset toggle open driver 106 and then through associated isolated pulse transformers 108 and 110 out of the carrier and amplifier driver 24 to amplifier 14 of FIG. 1 to open the reset switch $S_R$.

At time $t=44$ microseconds, the next clock pulse from clock 20 advances timer 18 to provide the signal represented in the eleventh line from the top of FIG. 11. This forty-four microsecond pulse is used to open the input clamp $S_B$ of pulse amplifier 14. It is applied to the line 82 associated with input clamp open driver 74 in FIG. 3. The associated AND circuit 78 also receives an OR'D enable signal on line 80 serving to pass a signal to the input clamp open driver 74 and from there through associated isolated pulse transformer 76 and out of the eight-driver of FIG. 3 to the L-bus power supply 28 of FIG. 1. Turning to FIG. 6 illustrating the L-bus power supply, the bottom isolation pulse transformer 150 passes this signal to open the input clamp toggle 154. This signal is sent from the L-bus power supply 28 to the pulse amplifier 14 to open input clamp $S_B$ as is illustrated at time 44 microseconds in the thirteenth line from the top of FIG. 11.

At time $t=48$ microseconds and the timer 18 provides the signal represented in the fourteenth line from the top of FIG. 11. This forty-eight microsecond pulse is used to close the high-line switch $S_H$ of FIG. 8 as follows. The signal is applied to H-programmed power supply on driver 74 of FIG. 3 through the associated input lines 82 and AND circuit 78 since the OR'D enable is also true on line 80. H-programed power supply on driver 74 then passes a signal through its associated isolated pulse transformer 76 to the H-bus power supply 26 of FIG. 1. Turning to FIG. 6, this pulse is passed through the top isolation pulse transformer 150 to provide an on signal to the H-programed power supply toggle and switch 152 which then generates a signal which is transmitted from the H-bus power supply 26 to the ten-channel switch 10, of FIG. 1. Turning to FIG. 2, this signal is applied to the emitter of transistor 62 of all of the single channel switches 12. In the channel being sampled, an enable signal is present at the base of the transistor 50 passing the carrier through transformers 52 and 54 and making it available in rectified form at the base of transistor 62. The simultaneous occurrence of this carrier in rectified form and the signal applied to the emitter of transistor 62 turns it on, driving the base of transistor 36 sufficiently to turn it on. Transistor 36 serves the function of the H-line switch $S_H$ of FIG. 8.

At time $t=84$ microseconds, the next clock pulse from clock 20 advances timer 18 to provide the signal represented in the ninth line from the top of FIG. 11. The eighty-four microsecond pulse is used to close the reset switch $S_R$ and to open the H-line switch $S_H$ and L-line switch $S_L$. Turning to FIG. 3 the eighty-four microsecond pulse is applied to the OR circuits 84 associated with the H- and L-programed power supply off drivers 74. They in turn pass signals on lines 86 to their associated AND circuits 78. Since the OR'D enable signal is present on line 80, signals are then passed to the H- and L-programed power supply off drivers 74 and through their associated isolated pulse transformers 76, to the H-bus power supply 26 and L-bus power supply 28 of FIG. 1, respectively. Turning to FIG. 6, these signals are each passed through the second isolation pulse transformer 150 from the top of their respective H- and L-bus power supplies, and in turn actuate the programed power supply toggle and switch 152, turning it off and passing a signal to the ten-channel switches. Turning to FIG. 2, this removes the signals in the case of the H-bus from the emitter of transistor 62 and in the case of the L-bus from the emitter of transistor 63, turning them off and causing transistor 36 and 38, respectively, to turn off disconnecting the transducer 40 from the amplifier 14 and is illustrated in the seventh and fifteenth lines of the timing diagram of FIG. 11.

Turning to FIG. 5 the eighty-four microsecond pulse is applied on line 114 associated with reset toggle close driver 106 and passes through the associated OR circuit 113 since only the one signal is necessary. The output from reset toggle close driver 106 passes through its associated isolated pulse transformers 108 and 110 to the pulse amplifier 14 where it closes reset switch $S_R$.

At time $t=88$ microseconds timer 18 provides the signal represented in the twelfth line of the timing diagram of FIG. 11. This pulse serves to open the transformer discharge switch $S_T$, open the input switch $S_A$, and close the input clamp $S_B$ as follows. Turning to FIG. 3 the eighty-eight microsecond pulse is applied to the OR circuits associated with the input switch open and the input clamp close drivers 74. This is all that is necessary for these OR circuits 84 to pass the signal to the AND circuit 78 associated with these drivers. Since the OR'D enable is present on line 80, the input switch open and input clamp close drivers 74 then pass signals through their associated isolated pulse transformers 76 to H-bus power supply 26 and L-bus power supply 28, respectively. Turning to FIG. 6, the signal from the input switch open driver 74 is received on the lower isolation pulse transformer 150, generating an open signal to open input switch toggle 154, which in turn generates a signal which is passed to the pulse amplifier 14 to open input switch $S_A$ as illustrated on the fifth line of the timing diagram of FIG. 11. In the L-bus power supply, the signal from the input clamp close driver 74 is received on the isolation pulse transformer 150 which is third from the top to generate a close signal to the input clamp toggle 154 which then closes the input clamp switch $S_B$ as is illustrated in the thirteenth line of the timing diagram of FIG. 11.

The transformer discharge switch $S_T$ is opened as is illustrated in the fourth line by applying the eighty-eight microsecond pulse to the transformer switch open driver 106 of FIG. 5 by way of line 114 and through OR circuit 113. Driver 106 then passes the signal through its associated isolated pulse transformers 108 and 110 to the pulse amplifier 14 to open the transformer discharge switch $S_T$.

At time $t$=92 microseconds timer 18 provides the signal represented in the second line from the bottom of FIG. 11, which is used to open the guard switch 30 of FIG. 1. This ninety-two microsecond pulse is applied to line 170 in FIG. 7 to actuate driver 166, which in turn will trigger toggle 162 and open switch 156, disconnecting the guard 160 from the L-bus 158.

The switches remain in this position for the rest of the sampling period until a pulse is generated at 144 microseconds which will reset timer 18 back to its first AND circuit and pass a pulse to sequencer 16 causing it to generate a new enable signal for the next channel to be sampled, and turning off the enable signal in the first line of FIG. 11 associated with the sampling cycle just discussed. Since it is normally followed by another enable signal for the next channel to be sampled, the OR'D enable signal on line two of the timing diagram of FIG. 11 will only turn off at the end of 144 microseconds illustrated if the enable signal is not immediately followed by a subsequent enable signal for another data channel.

The purpose of the switching sequence described above will now be described. After the occurrence of the enable pulse, at 4 microseconds the input switch $S_A$ and the transformer discharge switch $S_T$ close to start a reset period, connecting the amplifier 14 to receive a signal from the next data channel. Four microseconds later the L-line switch $S_L$ and the guard clamp are closed. This connects the L-bus to amplifier input guard and charges the reset capacitor 180 to a level which delivers zero volts out of amplifier 14, since the input is shorted with $S_A$ and $S_B$ closed. This serves to eliminate offset in the output of the amplifier 14. This is followed by a sample period during which $S_R$ first opens followed by $S_B$ to remove the reset and input clamping. $S_H$ then closes connecting the H-line with the input of the amplifier to permit it to sample the signal on the transducer referenced to a common point due to the charging of the capacitor 180 described above. $S_L$ and $S_H$ then open removing the signal and $S_R$ closes providing unity feedback around post amplifier 182 at the end of the sampling time, and a discharge period begins. Shortly thereafter $S_T$ and $S_A$ open and $S_B$ closes. Then the guard clamp opens. With $S_B$ and $S_R$ closed and $S_A$ and $S_T$ open the current in the error junction transformer 191 of FIG. 8 and feedback transformer 188, decay virtually to zero. The amplifier is then ready for the next reset period.

While a particular embodiment of the invention has been described, it will be understood, of course, that it is not intended to limit the invention thereto, since many modifications may be made and that it is therefore contemplated by the appended claims to cover any such modifications as fall within the true spirit and scope of the invention.

What is claimed as new and desired to be secured by Letters Patent of the United States is:

1. In an electronic commutator for a multichannel data sampling system including an amplifier having more than one stage in series including at least one final stage, an input and a pair of input terminals, an input switch in series with said input of said amplifier between said input terminals, an input clamp across said input terminals, a reset capacitor in series with and prior to said at least one final stage of said amplifier, a reset switch across said at least one final stage of amplification, a discharge switch connected in series with a feedback transformer from the output to the input of said amplifier, means for generating a limit signal indicative of either plus or minus voltage saturation connected to the output of the amplifier, and an input guard circuit, the combination comprising;

a plurality of data signal channels each having a high and a low line for connection to said input terminals, a high-line switch in each of said channels for connecting said high-line to one of said input terminals, a low-line switch in each of said channels for connecting said low-line to the other of said input terminals, enable signal means for enabling said data channels in a programed sequence, a guard clamp for connecting said low-line to said guard circuit, means for performing the following switching sequence in an enabled data channel and in said amplifier during the time period said particular channel is enabled (a) close said input switch and discharge switch, (b) close said low-line switch and said guard clamp, (c) open said reset switch, (d) open said input clamp, (e) close said high-line switch, (f) open said low and high-line switches and close said reset switch, (g) open said discharge and input switches and close said input clamp, and (h) open said guard clamp, and means for performing the following switching in the event of occurrence of either a plus or a minus limit signal, open said high and low line switches, input switch and discharge switch and close said input clamp, reset switch and guard clamp.

2. An electronic commutator according to claim 1 in which means are provided to actuate said high and low line switches in an enabled channel including; a first transistor having emitter, collector and base electrodes; means for applying a carrier frequency signal and said enable signal to said emitter and base electrodes respectively; a second transistor having emitter, base and collector electrodes; means for applying the output of the collector of said first transistor through isolation transformers and a rectifier circuit to the base of said second transistor; means for applying a switching signal to the emitter of said second transistor; and means for applying the collector output from said second transistor to switch one of said high or low-line switches.

3. In an electronic commutator for a multichannel data sampling system including an amplifier having more than one stage in series including at least one final stage, an input and a pair of input terminals, an input switch in series with said input of said amplifier between said input terminals, an input clamp across said input terminals, a reset capacitor in series with and prior to said at least one final stage of said amplifier, a reset switch across said at least one final stage of amplification, a discharge switch connected in series with a feedback transformer from the output to the input of said amplifier, and an input guard circuit, the combination comprising;

a plurality of data signal channels each having a high and a low line for connection to said input terminals, a high-line switch in each of said channels for connecting said high-line to one of said input terminals, a low-line switch in each of said channels for connecting said low-line to the other of said input terminals, means for enabling said data channels in a programed sequence, a guard clamp for connecting said low-line to said guard circuit, and means for performing the following switching sequence in an enabled data channel and in said amplifier during the time period said particular channel is enabled (a) close said input switch and discharge switch, (b) close said low-line switch and said guard clamp, (c) open said reset switch, (d) open said input clamp, (e) close said high-line switch, (f) open said low and high-line switches and close said reset switch, (g) open said discharge and input switches and close said input clamp, and (h) open said guard clamp.

4. In an electronic commutator for a multichannel data sampling system including an amplifier having more than one stage in series including at least one final stage, an input and a pair of input terminals, an input switch in series with said input of said amplifier between said input terminals, an input clamp across said input terminals, a reset capacitor in series with and prior to said at least one final stage of said amplifier, a reset switch across said at least one final stage of amplification, and a discharge switch connected in series with a feedback transformer from the output to the input of said amplifier, the combination comprising;

a plurality of data signal channels each having a high and a low line for connection to said input terminals, a high-line switch in each of said channels for connecting said high-line to one of said input terminals, a low-line switch in each of said channels for connecting said low-line to the other of said input terminals, means for enabling said data channels in a programed sequence, and means for performing the following switching sequence in an enabled data channel and in said amplifier during the time period said particular channel is enabled (a) close said input switch and discharge switch, (b) close said low-line switch, (c) open said reset switch, (d) open said input clamp, (e) close said high-line switch, (f) open said low and high-line switches and close said reset switch, and (g) open said discharge and input switches and close said input clamp.

5. In an electronic commutator for a data sampling system including an amplifier having more than one stage in series including at least one final stage, an input and a pair of input terminals, an input switch in series with said input of said amplifier between said input terminals, an input clamp across said input terminals, a reset capacitor in series with and prior to said at least one final stage of said amplifier, a reset switch across said at least one final stage of amplification, a discharge switch connected in series with a feedback transformer from the output to the input of said amplifier, and means for generating a limit signal indicative of either plus or minus voltage saturation connected to the output of the amplifier, the combination comprising;

a data signal channel having a high and a low line for connection to said input terminals, a high-line switch for connecting said high-line to one of said input terminals, a low-line switch for connecting said low-line to the other of said input terminals, means for performing the following switching sequence (a) close said input switch and discharge switch, (b) close said low-line switch, (c) open said reset switch, (d) open said input clamp, (e) close said high-line switch, (f) open said low and high-line switches and close said reset switch, and (g) open said discharge and input switches and close said input clamp, and means for performing the following switching in the event of occurrence of either a plus or a minus limit signal, open said high and low-line switches, input switch and discharge switch and close said input clamp and reset switch.

6. In an electronic commutator for a multichannel data sampling system including an amplifier having more than one stage in series including at least one final stage, an input and a pair of input terminals, an input switch in series with said input of said amplifier between said input terminals, an input clamp across said input terminals, a reset capacitor in series with and prior to said at least one final stage of said amplifier, a reset switch across said at least one final stage of amplification, a discharge switch connected in series with a feedback transformer from the output to the input of said amplifier, and means for generating a limit signal indicative of either plus or minus voltage saturation connected to the output of the amplifier, the combination comprising;

a plurality of data signal channels each having a high and a low line for connection to said input terminals, a high-line switch in each of said channels for connecting said high-line to one of said input terminals, a low-line switch in each of said channels for connecting said low-line to the other of said input terminals, means for enabling said data channels in a programed sequence, means for performing the following switching sequence in an enabled data channel and in said amplifier during the time period said particular channel is enabled (a) close said input switch and discharge switch, (b) close said low-line switch, (c) open said reset switch, (d) open said input clamp, (e) close said high-line switch, (f) open said low and high-line switches and close said reset switch, and (g) open said discharge and input switches and close said input clamp, and means for performing the following switching in the event of occurrence of either a plus or a minus limit signal, open said high and low-line switches, input switch and discharge switch and close said input clamp and reset switch.

7. In an electronic commutator for a multichannel data sampling system including an amplifier having a pair of input terminals the combination comprising, a plurality of data channels each having a high and a low-line for connection to said input terminals, a high-line switch in each of said channels for connecting said high-line to one of said input terminals, a low-line switch in each of said channels for connecting said low-line to the other of said input terminals, enable signal means for enabling said data channels in a programed sequence for connection to said terminals, means for first closing said low-line switch prior to closing said high-line switch in a particular channel during the time said channel is enabled.

8. In an electronic commutator for a data sampling system including an amplifier having more than one stage in series including at least one final stage, an input and a pair of input terminals, an input switch in series with said input of said amplifier between said input terminals, an input clamp across said input terminals, a reset capacitor in series with and prior to said at least one final stage of said amplifier, a reset switch across said at least one final stage of amplification, and a discharge switch connected in series with a feedback transformer from the output to the input of said amplifier, the combination comprising;

a data signal channel having a high and a low line for connection to said input terminals, a high-line switch for connecting said high-line to one of said input terminals, a low-line switch for connecting said low-line to the other of said input terminals, means for performing the following switching sequence:

(a) close said input switch and discharge switch,
(b) close said low-line switch,
(c) open said reset switch,
(d) open said input clamp,
(e) close said high-line switch,
(f) open said low and high-line switches and close said reset switch, and
(g) open said discharge and input switches and close said input clamp, means to actuate said high and low-line switches including a first transistor having three electrodes, means for applying a carrier frequency signal and an enable signal to two of said electrodes, a second transistor having three electrodes, means for applying the output of the third electrode of said first transistor to one electrode of said second transistor, means for applying a switching signal to a second electrode of said second transistor, and means for applying the output from the third electrode of said second transistor to switch one of said high or low-line switches.

References Cited

UNITED STATES PATENTS 3,249,883 5/1966 Berneike et al. ----- 328—104 X

ARTHUR GAUSS, *Primary Examiner.*

JOHN ZAZWORSKY, *Assistant Examiner.*

U.S. Cl. X.R.

328—154; 307—243, 253; 179—15